United States Patent [19]

Petersen

[11] Patent Number: 4,658,214

[45] Date of Patent: Apr. 14, 1987

[54] MAGNETIC POSITION INDICATOR USING MULTIPLE PROBES

[75] Inventor: Christian C. Petersen, Westwood, Mass.

[73] Assignee: Polaroid Corporation, Cambridge, Mass.

[21] Appl. No.: 454,045

[22] Filed: Dec. 28, 1982

[51] Int. Cl.⁴ .................. G01B 7/10; G05B 11/32
[52] U.S. Cl. .................. 324/207; 324/226; 324/260; 318/687
[58] Field of Search ............. 324/207, 208, 232, 234, 324/228, 235, 246, 226, 251, 262; 318/687; 323/368; 338/32 H; 354/234, 235; 335/205; 310/13, 27, 12, 15, 19

[56] References Cited

U.S. PATENT DOCUMENTS

| | | | |
|---|---|---|---|
| 3,041,416 | 6/1962 | Kuhrt | 324/251 X |
| 3,199,630 | 8/1965 | Engel et al. | 187/29 |
| 3,329,833 | 7/1967 | Dorsch | 307/88.5 |
| 3,344,347 | 9/1967 | Stevens | 324/45 |
| 3,419,798 | 12/1968 | Walton | 324/251 |
| 3,449,664 | 6/1969 | Smith | 324/235 |
| 3,473,109 | 10/1969 | Magz et al. | 324/208 |
| 4,041,427 | 8/1977 | Chusha | 335/205 |
| 4,093,197 | 6/1978 | Haeussermann | 324/207 X |
| 4,112,450 | 9/1978 | Kondo | 354/235.1 |
| 4,171,897 | 10/1979 | Fujita et al. | 354/235.1 X |
| 4,317,624 | 3/1982 | Shenk | 354/139 |
| 4,318,038 | 3/1982 | Munehiro | 318/135 |
| 4,325,614 | 4/1982 | Grimes | 354/23 D |
| 4,401,944 | 8/1983 | Narimatsu et al. | 324/207 |

Primary Examiner—Reinhard J. Eisenzopf
Assistant Examiner—Warren S. Edmonds
Attorney, Agent, or Firm—Leslie J. Payne

[57] ABSTRACT

There are disclosed an improved method of and apparatus for use in monitoring or controlling the positional relationship of two relatively movable members. A leading and a trailing magnetic sensing probe are coupled to one of the members. Each probe is fixedly spaced relative to the other probe, and both are arranged so as to cut a magnetic field along a path of varying field strength generated by magnetic means on the other member. Control means are provided for periodically determining the values of the field strength measured by each of the probes and storing a value related to the measured value of a leading one of the probes as viewed in the direction of relative movement. The control means compares the stored value with the present value of the lagging probe so as to define the relative movement in accordance with the incremental separation of the probes and the relationship of the stored and present values.

8 Claims, 5 Drawing Figures

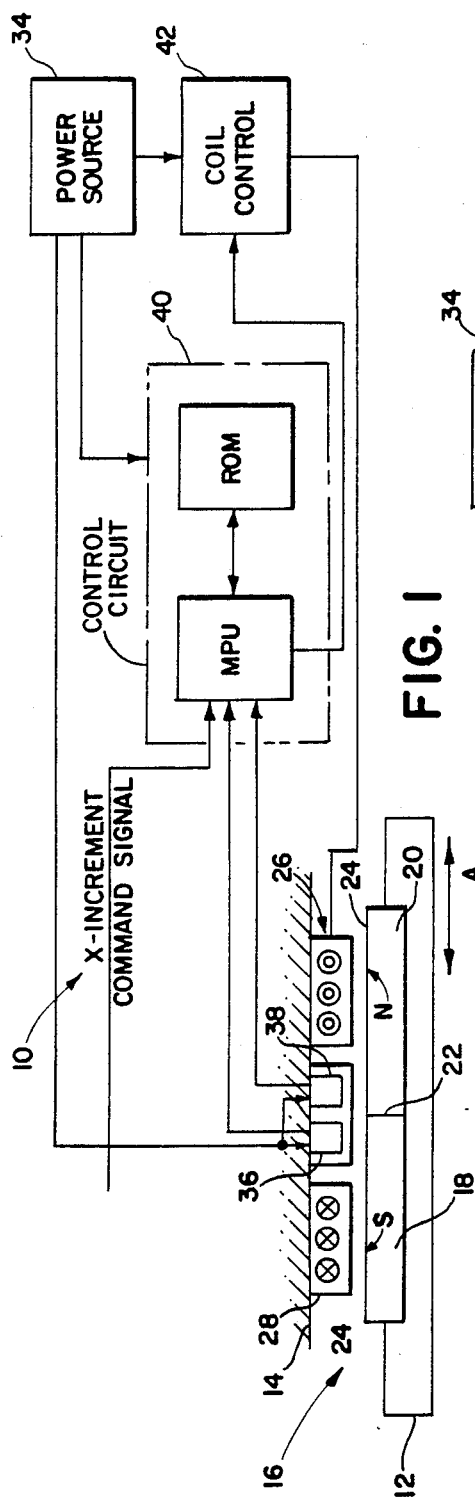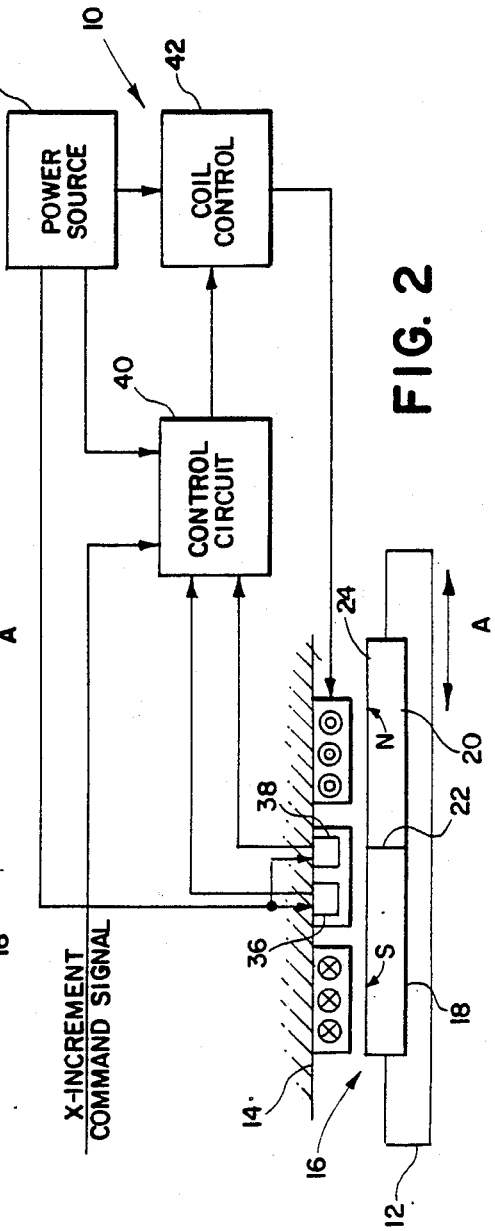

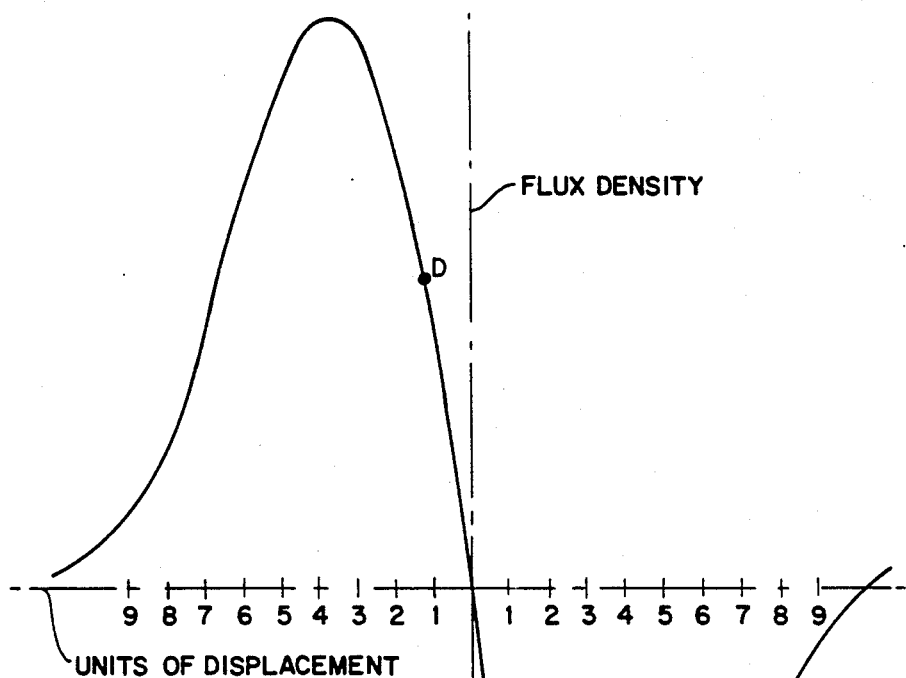
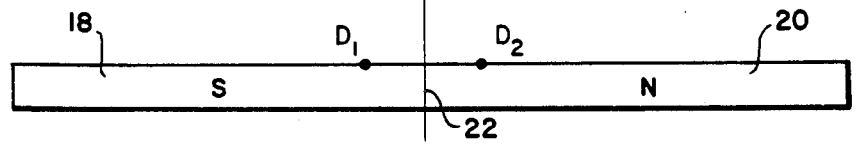
FIG. 4

MAGNETIC POSITION INDICATOR USING MULTIPLE PROBES

BACKGROUND OF THE INVENTION

This invention relates broadly to position responsive systems and, in particular, position responsive systems of the magnetic type.

Many kinds of position responsive systems are well-known. Typically, these monitor the relative position of a moving object relative to some reference, or control positioning of relatively movable objects by translating motion of the moving object into a feedback signal for closed-loop control of the moving object.

It is also well-known to use magnetic sensing arrangements for such systems. A rather common magnetic sensing arrangement utilizes the principle of the Hall effect. To take advantage of the Hall effect, use is made of a Hall probe or generator, whose output voltage is proportional to the product of the current passing through it and the magnetic field perpendicular to it. Thus, Hall generators have the advantage of providing a voltage output when the transducer is at a standstill. These characteristics facilitate its use in position responsive systems.

In known position controlling systems using Hall probes, the accuracy desired is often difficult to achieve. This is because there are many sources for potential error. One relatively common source is the occurrence of undesired gap variations between the probe and the magnet(s) which field(s) are cut by the former. Such variations can arise from improperly positioning the probe during assembly or, as is more common, shifting of the probe relative to the magnet after use. Another source of error can arise from imperfections in the magnets which affect adversely the reliability of their field strengths.

Efforts have been undertaken to improve accuracy of such position responsive systems. In this regard, reference is made to U.S. Pat. No. 3,329,833, which discloses use of several Hall probes. These are arranged in series with each other and are aligned relative to a sequence of magnetized scale graduations. The Hall probes are regularly spaced from each other by a distance corresponding to one-half period of the magnetized scale indicia to be scanned. The provision of several Hall probes is intended to not only increase total signal voltage, but also permit averaging of the several responses. Averaging, of course, increases accuracy. Such an approach, while minimizing the effect of error, does so at the expense of system simplicity. Moreover, such a system is still subject to errors arising from gap variations between the probes and the magnetic scale.

None of the known position responsive systems of the magnetic type enable precise, real time control or monitoring of the positioning of a pair of relatively movable members despite undesired variations in gap spacings or unreliable field strengths, let alone perform such functions in an economical, efficient and simple manner.

SUMMARY OF THE INVENTION

It is an object of the present invention to provide a position responsive apparatus having an improved magnetic sensing arrangement.

In an illustrated embodiment of this invention, there is provision for an apparatus for monitoring and controlling the relative displacement between a pair of members, one of which is moved along a given path.

The apparatus comprises sensing means operatively connected to a first of the members for sensing magnetic field strength. Included in the sensing means is at least a pair of magnetic sensing probes of equal or known proportional response which are spaced apart with respect to each other by a given incremental distance. Operatively connected to the second member is a magnetic means for providing a fixed magnetic field. The magnetic means and the sensing means are configured and arranged so that during relative movement, the sensing means moves along a sensing path of varying field strength. Control means for periodically determining the values of the field strength measured by each of the probes is provided. The control means includes means for storing a value at least related to the measured value of a leading one of the probes, as viewed in the direction of relative travel, and for then comparing this stored measured value with the present value of the lagging one of the probes. This defines the relative movement of the members in accordance with the incremental separation of the probes and the relationship between the stored and present values.

In a preferred embodiment, during each period or cycle the field strength value of each probe is read and the value of the leading probe, in the direction of relative movement, is stored. The control means stores a value related to the measured value of the leading probe. The trailing or lagging probe continues to read the field strength until it matches the stored value taken by the leading probe. At this point in time, the members have been relatively displaced by an increment equal to the distance between the probes. These steps are repeated until the trailing probe reaches a point which matches the multiple of increments represented by the command signal. When this occurs, the members have been displaced accurately. The slope of the magnetic field strength between the probes can be determined so as to control the rate of displacement.

A method of controlling the positioning of at least a pair of such relatively movable members is provided.

Other objects and further scope of applicability of the present invention will become apparent from the detailed description to follow taken in conjunction with the accompanying drawings wherein like parts are indicated by like reference numerals throughout the several views.

BRIEF DESCRIPTION OF THE DRAWINGS

FIG. 1 is a schematic diagram of the position responsive monitoring apparatus made in accordance with the principles of the present invention showing the relative position of the members during one mode of operation;

FIG. 2 is a schematic diagram of the apparatus of FIG. 1, but illustrating the components in a different relative position;

FIG. 4 is a graph illustrating the magnetic flux density generated by a pair of juxtaposed fixedly spaced-apart magnets; and, FIG. 5 is a graph depicting a pair of magnetic field strength curves.

DETAILED DESCRIPTION

Reference is now made to FIGS. 1 and 2 for showing the improved position responsive apparatus 10 of the present invention. In the illustrated embodiment, the position responsive apparatus 10 controls the positioning of two members 12 and 14 mounted for relative movement with respect to each other. The member 12 is mounted for translational movement relative to a stationary member 14 along a generally linear path; indicated by arrows A. The movable member 12 can itself be any suitable output device or it can be connected to a workpiece (not shown). For instance, the movable member 12 might be a programmable shutter.

Figure 3:
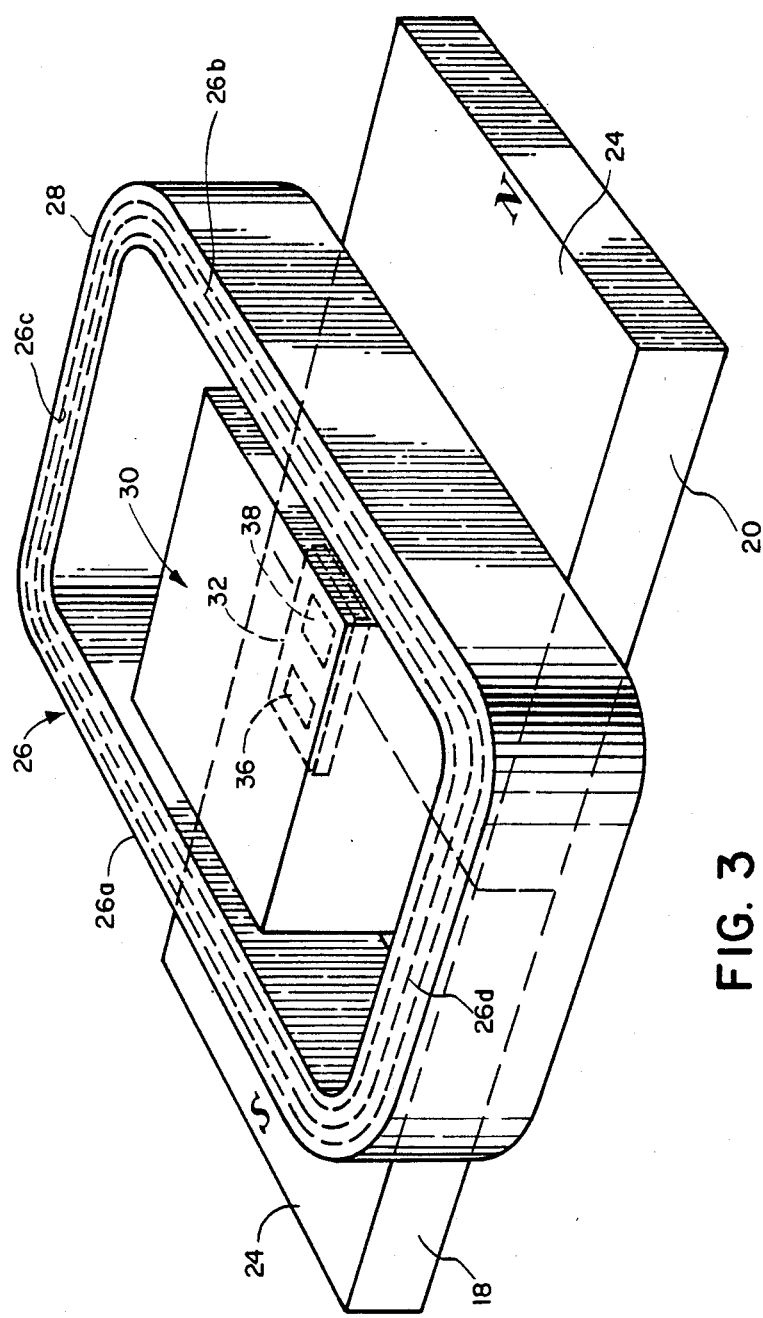
FIG. 3 is a schematic perspective view showing parts of the apparatus of the present invention.

Included in the position responsive apparatus 10 is a magnetic arrangement 16 having a pair of juxtaposed permanent magnets 18 and 20 carried by a common surface of the movable member 12. Both the permanent magnets 18 and 20 are, preferably, of the rare earth type, such as samarium cobalt. In this embodiment the permanent magnets 18 and 20 are thin, flat and have a generally rectangular configuration (FIG. 3). Both the magnets 18, 20 abut each other along a common juncture 22. The exposed surfaces 24 are coplanar with respect to each other, and the magnetic polarity of each is opposite to the other. For illustration purposes, the exposed surface 24 of the permanent magnet 18 has a south polar S magnetization, while the exposed surface of the permanent magnet 20 has a north polar N magnetization. The fields of these magnets 18, 20 extend in a manner and direction which are generally perpendicular to the given path A and encompass the field coil assembly 26. Also, their field strengths are equal and adequate for generating Hall voltages with strength sufficient for control purposes. The significance of these juxtaposed and opposed magnetic fields will be described subsequently.

In addition to FIGS. 1 and 2, reference is also made to FIG. 3 for better showing a generally planar field coil assembly 26. As shown, the coil assembly 26 has parallel and opposed longitudinal winding portions 26a, 26b extending generally parallel to the juncture 22 and through the magnetic fields created by the permanent magnets 18, 20; respectively. Winding portions 26c, 26d bridge the longitudinal portions 26a, 26b outside the fields of the permanent magnets 18, 20. Preferably, the winding portions 26a–d are encased in a suitable plastic jacket, indicated generally by reference numeral 28. When energized with current having a given polarity, the coil portions 26a, 26b will have the current flowing therethrough in opposite directions.

For illustration purposes, reference is again made to FIGS. 1 and 2, wherein the coil winding portions 26a are shown having current flowing from the plane of the paper and indicated by the symbol ".". The current flowing through coil portion 26b has the current flowing into the plane of the paper and indicated by the symbol "x". It will be recognized that the direction of the current flowing through the coil winding portions 26a,b may be reversed. With current flowing through the coil winding portions 26a,b, electromagnetic fields are created. These fields interact with the fields of the permanent magnets 18, 20 for displacing the movable member 12. Current polarity determines the direction of displacement, while amplitude determines speed or force. It is desired to have the winding portions 26a,b in the fields such that they cut field strengths of equal value as they move. Thus, constant moving forces can be developed.

Also included in the magnetic sensing arrangement 16 is a magnetic sensing and control circuit assembly indicated generally by reference numeral 30 (FIG. 3). The sensing and control assembly 30 is affixed to the stationary member 14. As so affixed, it is disposed centrally with respect to the coil assembly 26 and the permanent magnets 18, 20. It is preferred that assembly 30 include a magnetic sensing and control circuit 32 which can be embodied in a single integrated circuit (IC) chip (FIG. 3). Advantageously, use of a chip in the foregoing arrangement facilitates construction of a highly miniaturized controller. For ease in describing the sensing and control circuit 32, it is shown in block diagram form (FIGS. 1 and 2), with only the Hall transducers shown disposed between the winding portions 26a,b.

Power for the magnetic sensing and control circuit 32 is, preferably, supplied from a direct current (DC) power source 34.

Included in the integrated circuit chip is a pair of serially arranged, juxtaposed Hall effect transducers or probes 36, 38, each one of which is fixedly spaced apart with respect to the other. The significance of this spacing will be described subsequently. Reference current is supplied to each of the Hall probes 36, 38 from the power source. Not only does the power source 34 energize the Hall effect probes 36, 38 but the coil assembly 26 as well. The Hall effect probes 36, 38 as shown in FIG. 1, are normally stationarily disposed above the juncture 22. For accuracy, the Hall probes 36, 38 have a uniform gap spacing above the permanent magnets 18, 20 during translation. It will be understood the Hall probes 36, 38 are mounted so that the lines of magnetic flux cut the probes generally perpendicular to the plane of control current flow through the probes. Thus, the Hall probes 36, 38 will effectively read in terms of millivolts the magnetic field strengths defined by the permanent magnets 18, 20. Preferably, the Hall probes 36, 38 have identical sensitivities for purposes of simplifying the electronic circuitry.

In accordance with the present invention, the probes 36, 38 are spaced apart by a predetermined, fixed incremental distance. This predetermined incremental fixed distance is used for incrementing the member 12 in a manner to be described. In the illustrated embodiment, the probes 36, 38 are spaced apart by about 0.050". The above value is given for purposes of illustration only. In accordance with the present invention, by having the probes 36, 38 formed on the single chip, they can be reliably spaced apart in a highly compact arrangement.

Although in this embodiment the Hall probes 36, 38 are operated on a constant DC current basis, it will be appreciated, however, that the sensor may be operated on a DC voltage basis. Since the Hall probes 36, 38 are operated on a constant DC current source, the resulting Hall voltages or output signals provided by the probes are directly proportional to the magnetic field strengths defined by the magnets 18, 20 which are perpendicular thereto.

The integrated circuit chip 32 also includes a control circuit 40. Included in the control circuit 40 is a microprocessor (MPU) which is responsive to a plurality of inputs. One input is an x-increment command signal. Such a command signal could be responsive to an exposure control system and be representative of, for example, the distance it is desired to move the member 12. Other inputs to the microprocessor would include the Hall voltages read by each of the Hall probes 36, 38. The microprocessor includes a buffer device for storing and feeding the previously noted inputs in appropriately encoded form so that it interacts with a read only memory (ROM). The ROM stores a program defining the microprocessor's operating instructions and a program which will manipulate the inputs from the buffer device. In this embodiment the ROM will, among other things, determine a number of measuring cycles based on the x-increment command signal, which is representative of the distance the member 12 is to move. Each measuring cycle is determined by the time it takes one of the probes to move a distance corresponding to the predetermined incremental spacing between the probes. The total number of cycles is determined by the x-increment command signal. For example, if the command signal is of a value which is representative of a distance of 0.500", then there will be 10 measuring cycles, since this latter distance is a multiple of 10 times the predetermined incremental spacing between the probes 36, 38 (i.e., 0.050"). If the command signal is of a value which is representative of 0.525", then the ROM can determine that there be 11 measuring cycles. Even though at the end of the 11th cycle the member 12 would have moved beyond the desired position, it could be brought back to the desired position in a manner to be described.

In each cycle, the field strengths of both probes are read. The value of the probe which is leading in the direction of travel is stored. A comparator device, also not shown, compares this stored value with the reading of the trailing probe until the latter matches the former. At this point in time, one measuring cycle will be complete because one incremental displacement, corresponding to the incremental spacing between the probes, has been achieved. The ROM can determine the slope of the field strength between the probes for each cycle. As will be discussed later, the slope determination can be used to facilitate relatively precise positioning of the member 12 whenever the command signal is of such a value which is a non-integer multiple of the incremental distance. Also, it can be used to control the rate of movement of the member 12 such that each cycle is approximately of the same duration. Towards this end, the coil control circuit 42 will be used as described subsequently. The slope of such signals is, of course, a function of the difference in the Hall voltage amplitudes, and the noted fixed incremental distance between the probes 36, 38. It should be noted that the slope determinations can be performed within microseconds. This thus enables readings of each cycle to be taken even though the member 12 is actually moving relative to the member 14.

The measuring cycles will continue until the trailing probe signal matches the voltage value corresponding to the command signal. When this occurs, a null condition arises which is effective to control the coil control circuit 42 so that current to the coil assembly 26 is discontinued. Hence, the coil assembly 26 will no longer be effective for purposes of driving the movable member 12.

Reference is made to FIG. 4 for showing the combined magnetic field strengths of the permanent magnets 18, 20. The graph of FIG. 4 shows the flux density of the magnets, as measured in gauss, as a function of the lineal distance of the magnets along path A.

As illustrated in FIG. 4, a solid-line curve B is representative of the flux densities or magnetic field strengths of the permanent magnets 18, 20 when a predetermined gap exists between the Hall effect sensor 36 and the coplanar outer surfaces 24. The advantages of such a placement of magnets is described more fully in copending and commonly-assigned U.S. patent application Ser. No. 433,468, filed Oct. 12, 1982, by C. C. Petersen et al. Thus, a detailed description of such a curve is not believed necessary. Also, a detailed description of the operation of the linear actuator used for driving the member 12 is given in such application. As observed, there is a significant degree of linearity in the flux densities generated by the combined fields of the permanent magnets when arranged in such a fashion. In this regard, the curve B has a substantial linearity of flux densities extending from point D to point D'. The linearity between points D and D' enables use thereof for easily controlling the member 12 anywhere between such points. The points D, D' on curve B correspond respectively to the points $D_1$, $D_2$ on the permanent magnets 18, 20.

It has also been determined that the flux density along the juncture 22 is zero. This is true despite variations in gap spacing. Zero flux density is particularly advantageous for use in position responsive mechanisms because it provides a convenient reference point.

Figure 5:
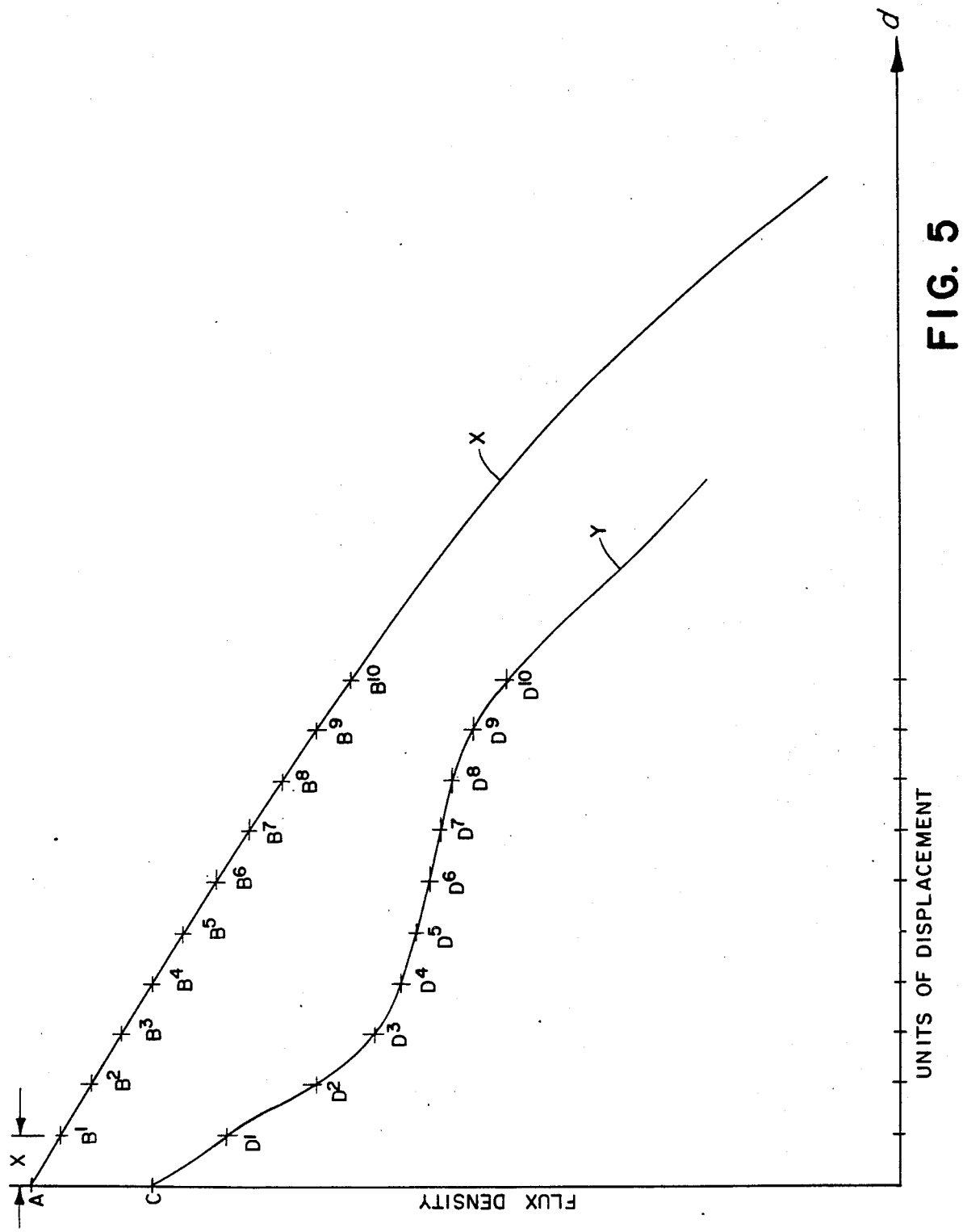

Reference is now made to FIG. 5 for better illustrating the mode of operation of the foregoing described embodiment. For purposes of illustration curves X and Y show different magnetic field strength profiles. These profiles vary as a function of linear distance along path A. From the standpoint of successfully practicing this embodiment, it is highly desirable to have the amplitude characteristics of these field strength curves vary substantially continuously as a function of such distance. This is because of the need to have differential readings for successfully incrementing the member 12 as well as to determine field strength slope. Thus, it is undesirable, in the context of the present embodiment, to have a magnetic profile in which the field strength is constant for any significant portion of the distance of such field (e.g., a distance exceeding the incremental distance between the probes).

It should be pointed out that in this embodiment the probes 36, 38 are coplanar but the probes need not be so. In this regard, the electronics can be modified so that the sensitivities of the probes are the same despite gap differences.

For purposes of illustration, let us assume it is desired to move the member 12, in this case a shutter, a distance of 0.5 inches. A photocell (not shown), such as one associated with an exposure control circuit, will generate a signal. The amplitude of this signal is related to the incremental distance it is desired to have the member 12 move. This signal is the x-increment command signal and causes the control circuit 40 to, among other things, actuate the coil control circuit 42. Operation of the coil control circuit 42 effects energization of the coil assembly 26 for driving the movable member 12 in a manner more specifically described in the last-noted application. As noted earlier, the spacing between the probes 36, 38 is 0.05 inches. The control circuit 40 in response to the x-increment command signal will undergo ten measuring cycles. Ten measuring cycles are employed because the desired 0.5 inches of displacement is a multiple of ten times the incremental spacing between the probes 36, 38. The determination of ten measuring cycles can be performed by a number of components, as for example, having the control circuit 40 employ a digital pulse counter. The x-increment command signal could command that the distance the member 12 should travel be a non-integer multiple of the incremental distance between the probes. In this case, the electronics would be arranged to allow use of the slope signal in the last measuring cycle for computation purposes so that one of the probes seeks the position corresponding to the command signal.

Let us assume the probes 36, 38 are at points A, $B^1$; respectively; on the curve X. When the control circuit 40 is operative for left to right operation the probes 36, 38 will read the Hall voltages at those points. Such voltages will be fed into a buffer storage device of the microprocessor. During movement, the probe 36 continues to read the field strength in real time until the value read matches the stored Hall voltage value taken at paint $B^1$ by probe 38. The movable member 12 will have advanced one incremental unit which corresponds to the incremental distance between the probes 36, 38. The position $B^1$ is, of course, located at a distance of 0.05 inches from point A. When this null position is reached, the measuring cycle is ended. As a result, the probe 36 is now positioned at point $B^1$, while the probe 38 is correspondingly positioned at point $B^2$. Once the real time value read by the probe 36 matches the stored Hall voltage value for point $B^1$ taken by the probe 38, the microprocessor is operative to again take the Hall voltage readings of the probes 36, 38 at the start of a new measuring cycle.

Once again the Hall voltages of the probes 36, 38 are read, and the value of the probe 38 at point $B^2$ is stored. The probe 36 again reads the real time field strength value during movement. When this real time value matches the stored value of the probe 38, the probe 36 is at point $B^2$ while the new position of probe 38 is at $B^3$. This ends a second measuring cycle. From the foregoing, it will be appreciated that the probe 36 has traveled another incremental distance equal to 0.05 inches. Even though the member 12 continues to move during these cycles, the circuit computations for termination and commencement of each cycle is done in microseconds so that there is no noticeable time lag that would cause inaccurate positioning of the member 12. The foregoing process is reiterated so that the movable member 12 is advanced until the probe 36 reaches point $B^{10}$ which represents the end of the ten measuring cycles. Thus, the movable member 12 has moved 0.50 inches.

In this embodiment, the control circuit's microprocessor will determine the field strength slope between the readings of the Hall probes 36, 38 at the beginning of each cycle. Once a slope determination has been computed, the coil control circuit 42 is operated in response thereto so as to energize the coil assembly 26. The member 12 is indexed so that member 12 travels each incremental distance in about the same time. Displacing the member 12 at a relatively uniform rate assists in control of the shutter movement. Additionally, the determination of slope is important in situations wherein the command signal is representative of a distance which is a non-integer multiple of the incremental distance between the probes 36, 38.

If, for instance, the x-increment command signal should command that the movable member 12 be displaced by 0.475 inches, which is a multiple of nine and one-half (9½) times the spacing between the probes 36, 38, then the microprocessor could be operated to take ten (10) measuring cycles. After the last or tenth cycle, the control circuit 40 operates the coil control circuit 42 so as to reverse polarity to the coil assembly 26. This will drive the member 12 in the opposite direction. In so doing, the trailing probe 36 now becomes the leading probe. It reads real time values until the real time value read matches the value corresponding to the x-increment command signal. The magnetic field strength value corresponding to the command signal is determined by computing the difference between the values read by the probes 36, 38 at the beginning of the last cycle and then multiplying this difference by the fractional amount of the command signal which exceeds the last integer. In other words, the difference between the Hall value read at points $B^9$ and $B^{10}$ is multiplied by 0.5 (i.e., the fractional amount which exceeds the last integer 9). The resulting value is subtracted from the value stored by the probe 38 at $B^{10}$. This new value is the interpolated value corresponding to the x-increment command signal. Thus, the probe 36 will read the interpolated value corresponding to the x-increment command signal. When a match occurs, a null condition is reached. This will cause the coil control circuit 42 to stop the current flow to the coil assembly 26. It will be appreciated that the ROM controlling the microprocessor instead of interpolating the field strength value corresponding to the command signal could extrapolate the value for the command signal. In the latter case, there would be nine complete measuring cycles with the slope of the last cycle being assumed to be the slope for that fractional cycle corresponding to the fractional amount of the command signal. The slope would be utilized in the same manner described for interpolating the value. The accuracy of such interpolations or extrapolations is premised on the actual field strength slope between the probes being linear. Obviously, non-linear slope conditions will cause errors. This potential for error may be minimized substantially if the incremental spacing between the probes is extremely small, such as in the order of the dimensions earlier indicated, and/or the magnetic profile that the probes 36, 38 track be substantially linear; such as shown in FIG. 4.

It will be appreciated that in dynamic systems of the kind just described there is a tendency for the movable member 12, as a result of momentum, to move beyond the desired position. It will be understood that the present invention contemplates that conventional control system approaches may be used to decelerate the movable member 12 so that such momentum is compensated for and thereby provide accurate position control. As pointed out, the probes 36, 38 have the same sensitivity. If they do not, then the control circuit 40 should take into account the imbalance so as to in effect electronically balance the readings of the probes.

Reference is now made to curve Y for showing the versatility of the present invention. As will be made apparent, the present invention compensates for changes to the magnetic field strength profile of the magnetic fields so that the movable member 12 may be accurately indexed virtually regardless of the resultant profile. In this regard, assume the probes 36, 38 are originally positioned at the points C and $D^1$. It will be appreciated that the profile for curve Y is significantly different than for curve X. In this regard, the slope changes more appreciably. Even though the slope changes, the probes 36, 38 continue to make their measurements and store the appropriate values for future comparison and computational purposes as they did when tracking the curve X. Thus, the member 12 will be incremented in accordance with the x-increment command signal. It will be appreciated then that the sensing arrangement is extremely versatile and reliable. Advantageously, then even if the field strength profile changes, the probes will be able to successfully track the resulting profile. Hence, the present invention can, therefore, accurately position two members relative to each other despite changes in amplitude characteristics of the field. This is, of course, highly advantageous in controllers utilizing magnetic sensing, because it would not be subject to error resulting from such changes. In this regard known position controllers using magnetic sensing tend to function best when there is a linear relationship between field strength and distance. Departures from such linearity or other preprogrammed profiles will cause errors of the type which cannot be automatically compensated for. On the other hand, such departures can be easily and accurately accommodated by the present invention.

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. Apparatus for monitoring the relative displacement between a pair of members, one of which is moved along a given path, said apparatus comprising:

sensing means operatively connected to a first of said members for sensing magnetic field strength, said sensing means including at least a pair of magnetic sensing probes spaced apart an incremental distance from each other;

magnetic means operatively connected to the second of said members for providing a magnetic field wherein the magnetic field strength thereof varies as a function of distance along a sensing path, said magnetic means and said sensing means being configured and arranged such that during the relative displacement, said sensing means moves along the sensing path of varying magnetic field strength; and, control means operatively coupled to said probes and being operable for determining the value of the field strength sensed by each of said probes and for storing a value related to the sensed value of a leading one of said probes, as viewed in the direction of the relative displacement, and for comparing the stored value with a present value of the other of said probes so as to define the relative distance traversed during the relative displacement of said members as a function of the incremental distance of said probes and the relationship of the stored and present values.

2. The apparatus of claim 1 wherein said control means includes means for determining when substantial equality is reached between the present and stored values and then, responsive to each occurrence of substantial equality, replacing the stored value with the then present value measured by said leading probe and for counting the number of occurrences of said substantial equality, whereby the relative distance traversed is defined by said number multiplied by the incremental distance.

3. The apparatus of claim 2 wherein said control means includes means for determining the field strength slope between said probes and for defining the relative distance traversed, which is a portion of the incremental distance, as a function of said other probe sensing a field strength value which is related to the slope and corresponds to said portion.

4. A method of monitoring the relative displacement between a pair of members, one of which is moved along a given path, said method comprising the steps of:

sensing a magnetic field strength by at least a pair of magnetic sensing probes spaced apart by a given incremental distance and operatively connected to a first member of the pair;

providing a magnetic field of varying strength which extends from a second member of the pair;

effecting relative displacement between the first and second members so that the sensing probes move along a sensing path of varying field strength; and, determining the relative distance traversed during the relative displacement of the members, said determining step including the steps of storing a value related to the sensed value of a leading one of the probes, as viewed in the direction of the relative displacement, and comparing the stored value with a present value of the other of the probes so as to define a difference therebetween and determining the distance traversed during the relative displacement as a function of the incremental distance and the relative changes in said difference.

5. The method of claim 4 wherein said determining step includes determining when substantial equality is reached between the present and stored values and then, responsive to each occurrence of the substantial equality for replacing the stored value with the then present value of magnetic field strength sensed by the leading probe and for counting the number of occurrences of substantial equality whereby the distance traversed is defined by said number multiplied by the incremental distance.

6. The method of claim 5 wherein said determining step further includes the step of determining the field strength slope between the probes and for defining the distance traversed, which is a portion of the incremental distance, as a function of the other probe sensing a field strength value which is related to the slope and corresponds to said portion.

7. A method of controlling the relative displacement between a pair of members, one of which is moved along a given path, said method comprising the steps of:

sensing a magnetic field strength by at least a pair of magnetic sensing probes spaced apart by a given incremental distance and operatively connected to a first member of the pair;

providing a magnetic field of varying strength which extends from a second member of the pair;

effecting relative displacement between the first and second members so that the sensing probes move along a sensing path of varying field strength; and, determining the value of the field strength sensed by each of the probes and storing a value related to the sensed value of a leading one of the probes, as viewed in the direction of relative displacement, and comparing the stored value with a present value of the other of the probes so as to define the relative distance traversed during said relative displacement of the members as a function of the incremental distance of the probes and the relationship of the stored and present values.

8. Displacement monitoring apparatus comprising:

a first member;

a second member;

means for mounting said first and second members for displacement relative to one another along a given path;

means for establishing a magnetic field fixedly positioned to said first member and having a continuously varying magnetic strength along said given path;

a first magnetic sensing probe fixedly mounted to said second member so as to move generally along said given path in the course of said relative displacement;

a second magnetic sensing probe fixedly mounted to said second member so as to generally traverse said given path in the course of said relative displacement a given incremental distance in trailing relationship to said first probe; and means for operating said first magnetic probe to obtain a first indication of said magnetic field strength in the immediate vicinity thereof at a selected interval during said relative motion and for operating said second magnetic probe to determine when it senses, in its immediate vicinity, the same strength of said magnetic field as said first indication of said magnetic field strength, the distance travelled by one of said members relative to the other along said given path being equal to said given incremental distance between said probes between the time said first indication of said magnetic field strength is obtained utilizing said first probe and said determination is subsequently made of said same magnetic field strength utilizing said second probe.

* * * * *